(12) United States Patent
Stankowski et al.

(10) Patent No.: US 7,153,425 B2
(45) Date of Patent: *Dec. 26, 2006

(54) PROCESS AND FILTER FOR FILTERING A SLURRY

(75) Inventors: Ralph Stankowski, Westford, MA (US); Stephen G. Hunt, Billerica, MA (US)

(73) Assignee: Entegris, Inc., Chaska, MN (US)

( * ) Notice: Subject to any disclaimer, the term of this patent is extended or adjusted under 35 U.S.C. 154(b) by 3 days.

This patent is subject to a terminal disclaimer.

(21) Appl. No.: 10/917,881

(22) Filed: Aug. 13, 2004

(65) Prior Publication Data

US 2005/0016936 A1  Jan. 27, 2005

Related U.S. Application Data

(62) Division of application No. 09/660,795, filed on Sep. 13, 2000, now abandoned.

(60) Provisional application No. 60/154,589, filed on Sep. 17, 1999.

(51) Int. Cl.
*B01D 25/00* (2006.01)
*B01D 27/00* (2006.01)
*B01D 29/46* (2006.01)
*B01D 29/56* (2006.01)

(52) U.S. Cl. .............. 210/335; 210/438; 210/440; 210/443; 210/446; 210/450; 210/455; 210/456; 210/489

(58) Field of Classification Search ............. 210/446, 210/455, 488, 489, 494.3
See application file for complete search history.

(56) References Cited

U.S. PATENT DOCUMENTS 604,931 A * 5/1898 Eisendrath ............... 210/445

(Continued)

FOREIGN PATENT DOCUMENTS

DE     3516341 A1 * 11/1986

(Continued)

*Primary Examiner*—Robert James Popovics
*Assistant Examiner*—T. Woodruff
(74) *Attorney, Agent, or Firm*—John E. Pillion; Timothy J. King

(57) ABSTRACT

The present invention comprises a process for filtering a slurry and a filter cartridge construction for filtering a slurry having a filtration medium formed of a depth filter such as a cylindrical seamless fibrous depth filter comprising a nonwoven fibrous mass, woven fibers, a plurality of nonwoven fibrous layers or a fibrous felt or the like or a wound depth filter retained within a housing substantially free of an open void volume upstream of the depth filter which causes separation of solid particles from a slurry being filtered The filtration medium is divided into a plurality of depth filter segments by spacers which are spaced apart from each other along the length of a filter cartridge housing which houses the depth filter, The spacers serve to divide the depth filter medium into depth filter segments and to allow fluid to pass there through along a defined path defined by the configuration of the open portions of the spacers. In addition the spacers are configured to seal the inner surfaces of the filter cartridge housing to prevent channelling of the slurry being filtered along the inner surfaces of the housing. By utilising the spacers, the compressibility of the filtration medium also is substantially reduced.

7 Claims, 7 Drawing Sheets

U.S. PATENT DOCUMENTS

| | | | | |
|---|---|---|---|---|
| 638,742 | A | * | 12/1899 | Murphy ..................... 210/117 |
| 837,845 | A | * | 12/1906 | Kiefer ........................ 210/455 |
| RE13,053 | E | * | 12/1909 | Paul ........................... 210/344 |
| 2,288,426 | A | * | 6/1942 | Stack .......................... 210/489 |
| 2,444,147 | A | * | 6/1948 | Walton ....................... 210/486 |
| 2,475,833 | A | * | 7/1949 | Gunn .......................... 210/133 |
| 2,548,584 | A | * | 4/1951 | Briggs ........................ 210/457 |
| 2,591,056 | A | * | 4/1952 | Ericson ....................... 210/486 |
| 2,654,440 | A | * | 10/1953 | Warren ....................... 210/347 |
| 2,683,029 | A | * | 7/1954 | Ralph .......................... 261/95 |
| 2,692,686 | A | * | 10/1954 | Fleck et al. ................... 210/97 |
| 2,750,047 | A | * | 6/1956 | Hasbrouck .................. 210/343 |
| 2,755,937 | A | * | 7/1956 | Gunn .......................... 210/492 |
| 2,787,333 | A | * | 4/1957 | Boone et al. ................. 96/139 |
| 2,813,632 | A | * | 11/1957 | Muller ........................ 210/486 |
| 2,844,255 | A | * | 7/1958 | Cavenah et al. ............ 210/170 |
| 3,003,643 | A | * | 10/1961 | Thomas ...................... 210/491 |
| 3,294,241 | A | * | 12/1966 | Clarence et al. ............ 210/232 |
| 3,398,834 | A | * | 8/1968 | Nuttall et al. .......... 210/321.84 |
| 3,537,592 | A | * | 11/1970 | Odgen et al. ............... 210/343 |
| 3,593,854 | A | * | 7/1971 | Swank ........................ 210/326 |
| 4,025,438 | A | * | 5/1977 | Gelman et al. ............. 210/484 |
| 4,115,277 | A | * | 9/1978 | Swank ........................ 210/436 |
| 4,347,208 | A | * | 8/1982 | Southall ...................... 264/229 |
| 4,661,250 | A | * | 4/1987 | Rosenberg .................. 210/352 |
| 4,704,207 | A | * | 11/1987 | Chu ............................ 210/347 |
| 4,744,901 | A | * | 5/1988 | Drori ........................ 210/323.1 |
| 4,793,922 | A | * | 12/1988 | Morton ....................... 210/317 |
| 4,793,928 | A | * | 12/1988 | Tsukamoto et al. ......... 210/344 |
| 4,844,806 | A | * | 7/1989 | Drori ........................... 210/448 |
| 4,876,007 | A | * | 10/1989 | Naruo et al. ................. 210/339 |
| 4,880,537 | A | * | 11/1989 | Drori ........................ 210/323.1 |
| 4,925,572 | A | * | 5/1990 | Pall ............................. 210/767 |
| 4,966,702 | A | * | 10/1990 | Drori ........................... 210/448 |
| 5,041,221 | A | * | 8/1991 | Drusi ....................... 210/323.1 |
| 5,069,790 | A | * | 12/1991 | Mordeki ................... 210/323.1 |
| 5,139,685 | A | * | 8/1992 | de Castro et al. ........... 210/767 |
| 5,271,838 | A | * | 12/1993 | Rahimi et al. .............. 210/346 |
| 5,338,448 | A | * | 8/1994 | Gjerde ...................... 210/198.2 |
| 5,368,729 | A | * | 11/1994 | Stefkovich et al. ......... 210/266 |
| 5,391,298 | A | * | 2/1995 | Pieper et al. ................ 210/638 |
| 5,472,600 | A | * | 12/1995 | Ellefson et al. ............. 210/317 |
| 5,472,605 | A | * | 12/1995 | Zuk, Jr. ....................... 210/436 |
| 5,536,286 | A | * | 7/1996 | Freeman ...................... 55/322 |
| 5,549,824 | A | * | 8/1996 | Trumpf et al. ........... 210/323.1 |
| 5,595,653 | A | * | 1/1997 | Good et al. ................. 210/289 |
| 5,797,978 | A | * | 8/1998 | Rosenberg et al. ............ 95/74 |
| 5,798,041 | A | * | 8/1998 | Zuk, Jr. ....................... 210/456 |
| 5,938,940 | A | * | 8/1999 | Zuk, Jr. ....................... 210/767 |
| 5,965,019 | A | * | 10/1999 | Olsen et al. ................. 210/331 |
| 6,093,230 | A | * | 7/2000 | Johnson et al. ............... 55/482 |
| 6,306,300 | B1 | * | 10/2001 | Harding et al. ............. 210/346 |
| 6,712,966 | B1 | * | 3/2004 | Pulek et al. ................. 210/317 |
| 6,827,851 | B1 | * | 12/2004 | Strohm et al. .............. 210/228 |
| 6,846,412 | B1 | * | 1/2005 | Hogan et al. ............... 210/227 |
| 6,875,352 | B1 | * | 4/2005 | Diemer et al. .............. 210/224 |
| 6,918,951 | B1 | * | 7/2005 | Rosenberg ..................... 96/60 |
| 2003/0159981 | A1 | * | 8/2003 | Diemer et al. .............. 210/346 |
| 2005/0011840 | A1 | * | 1/2005 | Stankowski et al. ........ 210/767 |
| 2005/0016936 | A1 | * | 1/2005 | Stankowski et al. ........ 210/767 |
| 2005/0061729 | A1 | * | 3/2005 | Strohm et al. .............. 210/284 |
| 2005/0121379 | A1 | * | 6/2005 | Strohm et al. .............. 210/284 |

FOREIGN PATENT DOCUMENTS

DE             3741552 A1 * 6/1989

* cited by examiner

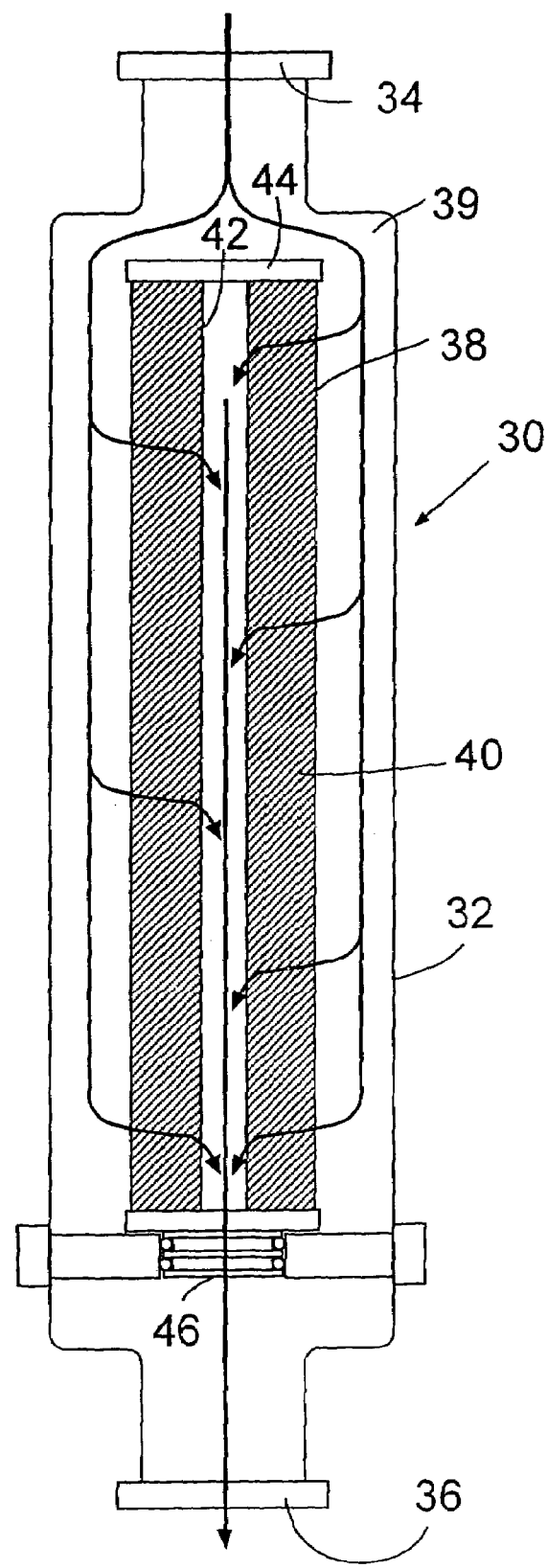
Prior Art   Fig. 2

PROCESS AND FILTER FOR FILTERING A SLURRY

This application is a divisional of U.S. Ser. No. 09/660,795 filed Sep. 13, 2000 now abandoned which claims priority to U.S. Provisional Application No. 60/154,589 filed Sep. 17, 1999.

BACKGROUND OF THE INVENTION

The present invention relates to a filter and a process for filtering particle containing or slurry like materials. More particularly, it relates to a depth filter and process for filtering slurries and compositions containing particles and/or gels such as CMP (chemical-mechanical planarization) slurries and photoresist chemicals.

A fluid composition containing a particulate solid component is referred to in the art as a "slurry". The solid component can be any of a variety of materials including solid particles, cell components, flocculating agents, gel particles or the like. These are found in many applications including photoresist chemicals, biopharmaceutical products and abrasive materials for the semiconductor industry.

Photoresist chemical compositions often contain gels and agglomerates of gels that are formed from the photoresist chemicals due to shear, shock or age of the chemicals. Such gels and agglomerates need to be removed prior to using these chemical compositions Biopharmaceutical liquid compositions such as cell broths, fermentation liquids, transgenic milks and other transgenic liquids, blood, blood fractions or other bacterial or animal fluids or secretions, contain whole cells, cell components, fats and other solids which need to be removed to in order to further process and recover desired components of these compositions.

Of particular interest are slurry compositions, utilised in CMP to polish wafers in VLSI and ULSI integrated circuit devices. High pH silica CMP slurries are utilised to polish dielectric and polysilicone layers. In addition, acidic silica and alumina or metal/metal oxide abrasive based slurries are utilised to polish metal interconnects. The CMP process uses sub micron (30–500 nm) abrasive particles at a typical concentration of 1–30% by weight.

The typical specification for commercial CMP slurries includes percent solids, pH, specific gravity, mean particle size and general (bulk) particle size distribution. However, a small number of "large" particles (>1 urn) have been found which fall outside of the specified size distribution. These particles can be aggregates, agglomerates or gels and may be formed from agglomeration, settling, system or pH shock or local drying of slurry. The large panicles and agglomerates can cause microscratches and they, together with the gels cause other defects on planarized wafer surfaces during CMP processing. Slurry filtration to remove these relatively large particles has proven to be beneficial in reducing wafer defects and increasing yields in CMP processes.

At the present time a wide variety of filter cartridge constructions are utilized to purify fluids. These cartridge constructions are designed to remove solids and colloidal particles as well as microorganisms. The basic two separate and distinct types of cartridges used in filtration of gases and liquids are depth filters (typically wound) and surface or screen filters (usually pleated). A depth filter is primarily used to remove most of the contaminants and particles. It is typically utilized upstream of a surface or screen filters. The most important properties for a depth filter are its "dirt holding capacity" or throughput, pressure drop and retention. The filter design allows contaminants and particles to be trapped in stages within the depth of the filter due to the construction of the multiple layers of various media types. A wound depth filter has multiple layers with the most open media (largest micron retention rating), i.e., largest pore size usually the outermost layer, adjacent the liquid inlet with the tightest media at the core adjacent the liquid outlet will have the least amount of surface area due to the smallest diameter around which it is wrapped. This layer at the core contributes to most of the pressure drop of the cartridge because the media has the highest pressure drop and the least amount of filtration surface area. Likewise, this layer will significantly reduce the capacity of the filter due to both the low filtration surface area and the smallest micron retention rating.

Presently available depth filters are positioned within a housing, spaced apart from the interior housing walls thereby to form a void volume upstream of the depth filter. This spacing is effected to permit either the introduction of a fluid feed into the entire filter or the removal of the entire permeate from the filter. If this spacing were not maintained, fluid flow through the filter can be severely restricted. As a result, a relatively large high fluid hold-up volume occurs in a conventional filter unit. A depth filter construction utilizing such a spacing also is disadvantageous for filtering a slurry since the particles in the slurry can settle out of the slurry on and within the filter. This results in rapid plugging of the filter, particularly at low flow rate point of use applications.

Depth filters comprising a relatively deep bed of filter material are undesirably compressible under the pressure of fluid entering the filter bed. Filter bed compressibility depends upon the type of filter, retention characteristics of the filter and thickness of the depth filter. For example, thicker filter beds are more compressible than thinner filter beds. When the filter bed is compressed, void volume is reduced and, the probability of plugging is increased. This results in an undesirably shod useful file of the filter. In addition, compression of the filter bed requires that the pressure of feed fluid be increased in order to maintain desired fluid through put rates. These conditions of increased pressure increase the probability of undesirable channelling of fluid in the space between the filter housing and the filter bed. Such channelling is undesirable since the channelled fluid does not pass through the filter bed and undesirably large particles are not removed from the fluid.

A surface of screen filter will retain virtually 100% of the particles or contaminants for which it is rated. The media used in surface or screen filter typically has a high pressure drop and low "dirt holding capacity" or throughput because of its high retention efficiency. The media normally used in a surface filter comprises glass or polymeric microfibers. Particles are retained by size exclusion primarily on the surface of the screen filter rather than within the depth of the filter. Particles smaller than the controlled pore size tend to be trapped within the media of the surface filter. However, as a result of the controlled pore structure, they provide more predictable filtration than depth filters. Screen filters are not useful for filtering a slurry since they will become plugged quickly by the solid particles and gels in the slurry.

Accordingly, it would be desirable to provide a filter cartridge including a depth filter for filtering a slurry that effectively removes undesirably large solid particles and gels. In addition, it would be desirable to provide such a filter cartridge that permits passage there through of particles in the slurry within a desired particle size range. Furthermore, it would be desirable to provide such a filter cartridge wherein compression of the depth filter is controlled to substantially prevent compression of the depth filter and channelling of the slurry being filtered.

SUMMARY OF THE INVENTION

The present invention comprises a process for filtering a slurry and a filter cartridge construction for filtering a slurry having a filtration medium formed of a depth filter such as a cylindrical seamless fibrous depth filter comprising a nonwoven fibrous mass, woven fibers, a plurality of nonwoven fibrous layers or a fibrous felt or the like or a wound depth filter retained within a housing substantially free of an open void volume upstream of the depth filter which causes separation of solid particles from a slurry being filtered The filtration medium is divided into a plurality of depth filter segments by spacers which are spaced apart from each other along the length of a filter cartridge housing which houses the depth filter, The spacers serve to divide the depth filter medium into depth filter segments and to allow fluid to pass there through along a defined path defined by the configuration of the open portions of the spacers. In addition the spacers are configured to seal the inner surfaces of the filter cartridge housing to prevent channelling of the slurry being filtered along the inner surfaces of the housing. By utilising the spacers, the compressibility of the filtration medium also is substantially reduced.

By the term "open void volume" as used herein is meant a volume free of a material including materials for forming a depth filter and is not meant to include the void volume normally encountered within the filter material in a conventional filter-housing construction.

In one embodiment, one end of the cartridge of this invention is sealed with a cap having a fluid inlet while the opposing end is sealed with a cap having a fluid outlet. In a second embodiment, both the fluid inlet and the fluid outlet are positioned on the same surface of the housing and a fluid conduit is provided within the housing to direct fluid from the inlet to the outlet. The spacers provide a seal along the inner surface of the housing and, in the case of the second embodiment, provide a seal along the conduit that directs fluid from the inlet to the other side of the housing where it then flows through the filter material to the outlet. When the filtration medium is a wound depth filter, it is positioned around a core that extends substantially the length of the cartridge. In this embodiment, the spacers provide a seal along the surface of the core in contact with the wound depth filter. When the depth filter comprises a nonwoven fibrous mass, it is compressed to effect the desired percent retention efficiency of the mass. The depth filter also can comprise a layered filter construction having a plurality of filtration media, each having a controlled percent retention rating. The layers of the depth filter are formed of felt layers, of wound or layered flat filtration sheets, woven fibers or of a fibrous mass of nonwoven polymeric fibers secured together by mechanical entanglement or interweaving of the fibers. The filter cartridges of this invention retain undesirably large particles and gel particles which permitting passage there through of particles of a slurry having a size within a desired size range.

BRIEF DESCRIPTION OF THE DRAWINGS

FIG. 2 is a cross-sectional view of the filter cartridge of the prior art.

DESCRIPTION OF SPECIFIC EMBODIMENTS

Figures 1, 3:
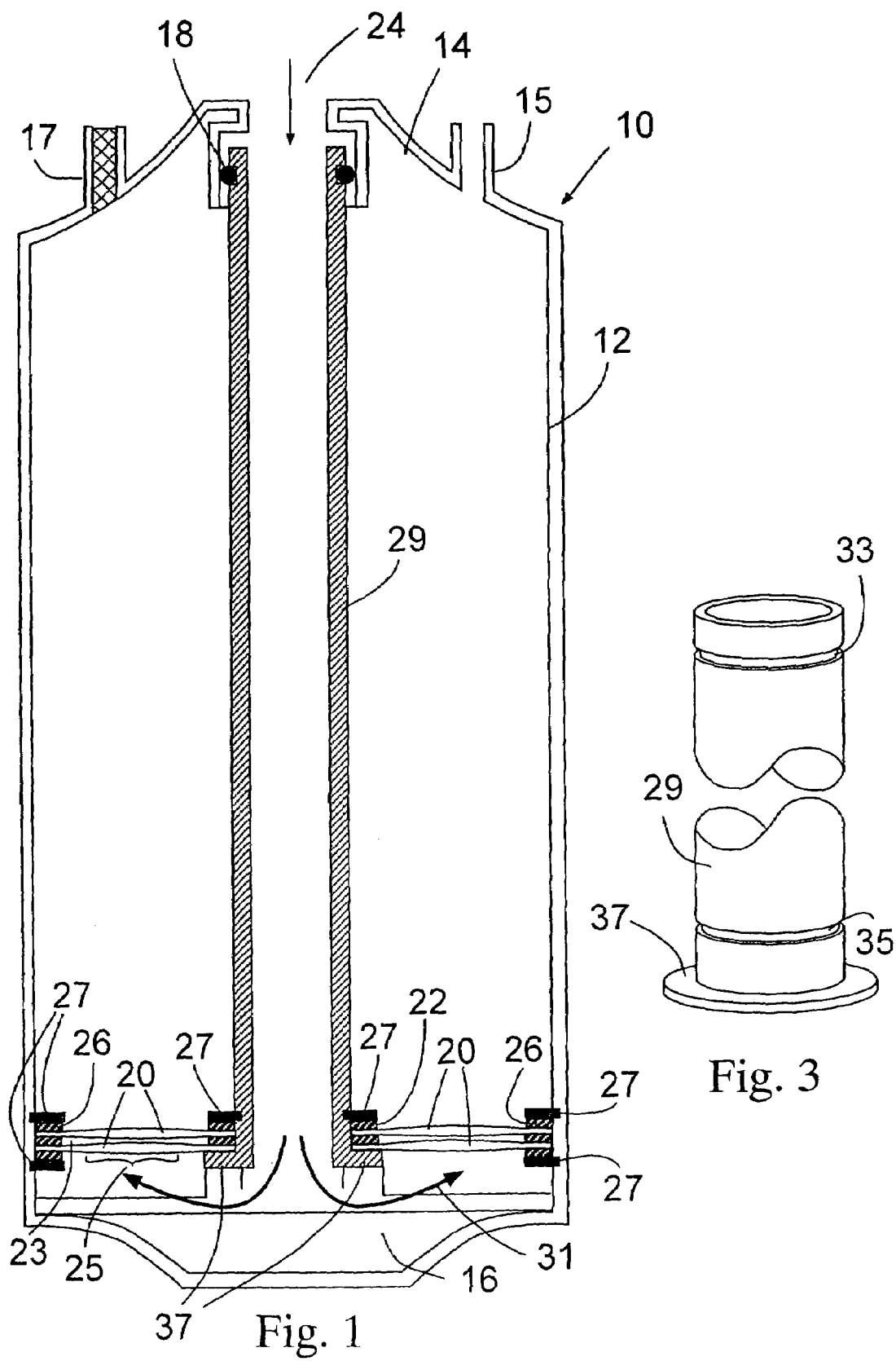
FIG. 1 is a cross-sectional view of a filter cartridge of this invention.
FIG. 3 is a side view of the center conduit of the cartridge of FIG. 1.
Figure 4:
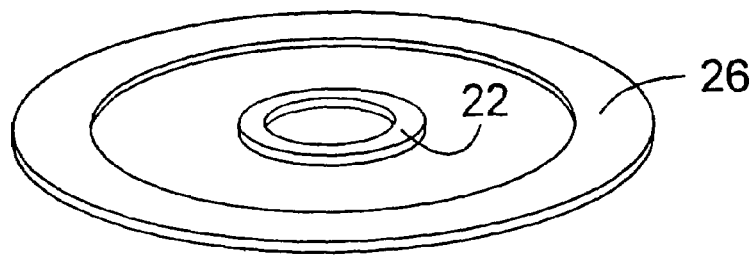
FIG. 4 is an isometric view of spacer arrangement for the cartridge of FIG. 1.
Figure 5:
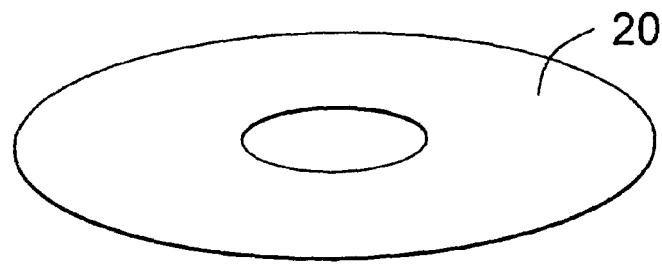
FIG. 5 is an isometric view of a filter segment of the cartridge of FIG. 1

The present invention provides a filter cartridge construction which comprises (1) a depth filter comprising either (a) a wound depth filter, (b) a stack of depth filters or (c) a cylindrical seamless fibrous depth filter formed from a fibrous mass of fibers positioned within a housing. The depth filter has a thickness in the direction of fluid flow there through of between about 1 (2.54 cm) and about 18 inches (45.72 cm), preferably between about 3 (7.62 cm) and about 12 inches (30.48 cm) to attain effective retention of undesirably large particles while permitting passage there through of particles within a desired size range.

The depth filter includes a plurality of annular spacers positioned within the depth filter in order to divide the depth filter into filter segments. The ratio of depth filter segment thickness to spacer thickness is between about 1.1:1 and about 5:1, preferably is between about 1.5:1 and about 3:1, The spacer configuration depends upon the low path of the slurry being filtered through the filter housing. In one embodiment, the slurry is passed in a first direction through an open conduit positioned within the housing and then in a second direction opposite the first direction through the filter segments. In this embodiment, both the fluid inlet to the housing and the fluid outlet from the filter housing are positioned on the same surface of the filter housing. In a second embodiment, the slurry is passed through the filter segments without first passing through an open conduit positioned within the housing. In this embodiment, the fluid inlet to the housing and the fluid outlet from the housing are positioned on opposing surfaces of the housing. The spacer in both of the embodiments of this invention has a thickness between about 0.01 (0.0254 cm) and about 0.12 inches (0.3048 cm), preferably between about 0.01 and about 0.07 inches. The spacers provide a means for substantially reducing the compressibility of the depth filter during use under the pressure of feed fluid. A spacer providing a depth filter segment to spacer ratio of thickness greater than about 5 is generally ineffective for reducing compressibility of the depth filter. A spacer having a thickness greater than about 0.12 inch (0.3048 cm) is undesirable since it will promote separation of solid particles from a slurry being filtered due to a large space between filter medium segments. In this instance, one may insert or bond a piece of filtration medium into the opening of the spacer to form an essentially continuous medium subject to the flow of fluid through out the length of the filter.

In the first embodiment of this invention, the spacer element at a given height within the filter housing is configured so that a seal is provided both along the inner surface of the housing and along the outer surface of the conduit positioned within the housing. This seal configuration prevents channelling of the fluid feed along these surfaces of the housing and conduit. The portion of the spacer element positioned along the outer conduit surface can be connected to the portion of the spacer element positioned along the inner surface of the housing a given height within the filter housing or these two portions of the spacer element can be unconnected to each other. When the two spacer element portions are connected to each other, they are connected in a manner that permits the fluid feed to pass through the entire height of the combined filter segments. When the spacer portions are not connected to each other they are spaced apart from each other a sufficient distance to permit the fluid feed to pass through the entire height of the combined filter segments. In addition, the spacer elements can be configured to have one or more open portions and a solid portion to effect a tortuous path of the fluid feed through the filter segments wherein the solid portions of the spacers block fluid flow through selected areas of the filtration elements.

The depth filter of this invention can comprise one or a plurality of media each having the same or different micron retention size. In one embodiment, the depth filter comprises a plurality of media (layers) each having a different micron retention size so that the permeability or retention of the media layers is largest adjacent the fluid outlet from the cartridge. Micron retention size can be varied by controlling the fiber size and/or fiber spacing. Thus, large particles will be retained adjacent the feed inlet and progressively smaller particles will be retained as the feed passes through the filter cartridge. The permeability or retention of the media layers is controlled so that particles in the slurry within a desired particle range pass through the cartridge and through the outlet. It has been found, in accordance with this invention, that the useful life of the cartridge of this invention is at least about 50 percent longer, preferably at least about 200 percent longer than a prior art filter cartridge having a void volume in a housing positioned upstream of a depth filter positioned within the housing. Thus, the filter cartridge of this invention permits the use of fewer cartridges for a particular application and lower cost as compared to the filter cartridges of the prior art. Percent retention efficiency and Beta Ratio are measures of the ability of the ridge to capture and retain particles. The Beta Ratio concept was introduced by the Fluid Power Research Center (FPRC) at Oklahoma State University (OSU) in 1970. Originally developed for use in hydraulic and lubricating oil filters, the test has been adapted by many cartridge manufacturers to measure and predict the cartridge filter performance in aqueous based fields. Beta Ratio is defined by the FPRC as the number of particles greater than a given size (x) in the feed, divided by the number of particles greater than the same size in the effluent. Both percent retention efficiency and Beta Ratio values are calculated for specific particle size ranges.

The following equations showed the relationship between Beta Ratio and percent retention efficiency $$\% \text{ Retention Efficiency} = \frac{\text{Number of feed particles} - \text{Number of effluent particles)(size } X)}{\text{Number of feed particles (size } X)} \times 100$$

$$\text{Beta Ratio } (B) = \frac{\text{Number of feed particles (size } X)}{\text{Number of effluent particles (size } X)}$$

$$\% \text{ Retention Efficiency} = \frac{B-1}{B} \times 100$$

$$\text{Beta Ratio } (B) = \frac{100}{100 - \% \text{ Retention Efficiency}}$$

In the filter cartridge of this invention, the filter medium of the depth filter having the largest micron retention is preferably positioned adjacent an inlet to the filter cartridge. The filter media of the depth filter having the smallest micron retention is preferably positioned adjacent the outlet from the filter cartridge. The micron retention characteristics of a filter can be varied by varying the diameter of fibers used to form the filter and/or the extent of compression of the fibers such as by winding a filter medium sheet tighter or looser around a core. A tighter wound filter medium gives a higher percent retention efficiency. The intermediate filter media are positioned according to percent retention of efficiency so that incoming slurry is passed sequentially through the filter media having progressively smaller micron retention and lastly through the filter media having the smallest micron retention. Thus the overall filter cartridge presents a percent retention efficiency that comprises a progressive gradient from the inlet to the outlet wherein the percent retention efficiency progressively increases. Representative media useful for forming the depth filter include the fibers of polyolefins such as polyethylene, polypropylene, cellulose, cellulose derivatives such as cellulose acetate, cotton, polyamides, polyesters, fiberglass, polytetrafluoroethylene (PTFE), fluoropolymers such as PFA, MFA and FEP or the like.

The fibrous depth filter is free of seams and is formed of fibers that produce a fibrous mass of fibers. This embodiment of the depth filter can be characterized by a gradation of micron retention characteristics throughout its thickness in the direction of fluid flow through the depth filter. This gradation can be achieved either by varying the void volume of the cylindrical fibrous depth filter medium as a function of thickness in the direction of fluid flow through the filter or by maintaining a constant volume and varying the size of the fibers as a function of depth filter thickness in the direction of fluid flow through the depth filter. In either embodiment all that is necessary is that the gradation of micron retention characteristics is produced. The gradation is effected such that the slurry to be filtered first encounters a layer of the depth filter having a largest micron retention characteristics (i.e. largest pores) and encounters layers having progressively smaller micron retention characteristics (i.e. smallest pores) prior to being directed through the outlet. The seamless cylindrical fibrous depth filter can be formed by any conventional means such as is disclosed in U.S. Pat. Nos. 3,933,557; 4,032,688t 4,726,901 or 4,594,202 which are incorporated herein by reference.

Representative slurries that can be filtered in accordance with this invention include CMP slurries such as silica-based slurries, alumina-based slurries, ceria-based slurries, diamond-based slurries, manganese dioxide-based slurries, titanium and other metal or metal oxide slurries. Additionally, representative biological-type slurries in which the filter of this invention can be used include cell brutish whether containing whole cells or ruptured cells or cellular components, fermentation products, a transgenic liquid such as transgenic milk, blood, a blood fraction or other slurries which contain large components which need to be separated from smaller components.

In one method for forming a cylindrical seamless fibrous depth filter, for example, a molten thermoplastic composition is spun from a multiplicity of orifices arranged at an angle to a rotating mandrel. The orifices are positioned at a plurality of distances from the mandrel, Gas is directed at the orifices in a direction generally in the direction of projection of the fibers from the orifices to attenuate and disrupt the fibers into discrete lengths. The fibers are collected and wound on the mandrel to form a generally spiralling wound cylindrical layer of randomly intertwined spun fibers and to form the seamless cylinder which can be removed from the mandrel. Micron retention characteristics for a given layer can be controlled by controlling the rate of exit of fibers from a particular set of orifices that produce a given layer, thereby to control the void volume in that layer.

In a second method, the cylindrical seamless fibrous depth filter is formed in a manner whereby the void volume throughout the filter thickness in the radial direction is essentially constant. The desired micron retention characteristic gradation is achieved by varying the size of the fibers throughout the cylindrical fibrous depth filter in the radial direction. The smallest fibers produce a layer having the smallest micron retention characteristics while the largest fibers produce a layer having the largest micron retention characteristics. The fibers are formed by extruding a molten thermoplastic composition from a fiberizing die. The fibers are attenuated by a gas stream directed to a rotating reciprocating mandrel. The fibers are cooled prior to their collection on the mandrel to a temperature below that the fibers bind to reach other to substantially eliminate fiber to fiber bonding. The cooled fibers are collected on the mandrel and are subjected to a compression force to effect a substantially constant void volume through the thickness of the cylindrical seamless fibrous depth filter in the radial direction. The cylindrical and fibers depth filter can be formed on the pleated on a core.

Typically, the void volume of the cylindrical fibrous depth filter ranges between about 60 and 95 percent and varies no more than about 1 to 2 percent. Typically the fibers range in diameter between about 1.6 and 16 micrometers. The compositions for forming the depth filter of this invention also can have specific properties either inherent or added such as hydrophilicity, hydrophobicity, a positive or negative charge or the like, The wound depth filter is formed by winding one or a plurality of filter sheets formed of fibers to form a joint generally cylindrical structure. The filter sheet or sheets have varying pore size such that the micron retention characteristic of a portion of the depth filter as a function of radial position within or on the depth filter. The portion of the wound depth filter positioned adjacent an inlet to the filter cartridge including the wound depth filter has the largest micron retention characteristics while the portion of the wound depth filter having the smallest micron retention characteristics, i.e. the smallest pore size is positioned adjacent the outlet from the filter cartridge. Any intermediate portions of the wound depth filter are positioned according to pore size so that incoming slurry is passed sequentially through portions of the depth filter having progressively smaller micron retention characteristics and lastly through the portion of the filter having the smallest micron retention characteristics. Representative media useful for forming depth filters include the fibers set forth above for the cylindrical seamless fibrous filters.

The depth filter can be formed from one or a plurality of separate filter sheets by stacking the sheets within a housing in a manner such that an open volume within the housing upstream of the depth filter that would promote particle separations from a slurry is avoided. The filter sheet or sheets can have the same pore size or varying pore size such that the micron retention characteristic of a portion of the depth filter varies along the length of the housing. When utilizing sheets having varying pore size, the portion of the filter stack positioned adjacent an inlet to the filter cartridge preferably has the largest micron retention characteristics while the portion of the filter stack having the smallest micron retention characteristics, i.e. the smallest pore size is preferably positioned adjacent the outlet from the filter cartridge. Any intermediate portions of the filter stack are positioned according to pore size so that incoming slurry is passed sequentially through portions of the depth filter having progressively smaller micron retention characteristics and lastly through the portion of the filter having the smallest micron retention characteristics. Representative media useful for forming the filter stack include the fibers set forth above for the cylindrical seamless fibrous filter.

Referring to FIGS. 1, 4, 5 and 7, the filter cartridge 10 of this invention includes a housing 12 and end caps 14 and 16 that are sealed to housing 12. The end caps 14 and 16 can be attached to housing 12 by any conventional means such as by being screwed onto an outside threaded surface of housing 12, by O-rings, other damping devices or by an adhesive means such as epoxy resin or melt bonding. End cap 14 is provided with an inlet 24 and outlet 15 while end cap 16 is closed and sealed to housing 12. A plurality of filter segments 20 are positioned within housing 12 separated by annular inner spacers 22 and annular outer spacers 26 throughout the height of the housing 12 not occupied by end caps 14 and 16. The spacers 22 and 26 can be retained in position by retainers 27 such as snap rings that fit into grooves of the interior wall of the housing 12 and on the outer surface of the internal conduit 29. Each of the filter segments 20 comprises a filter medium as described above. The interior of housing 12 is free of open volumes. That is, it is completely filled with the stack of filter sheets 20 separated by annular spacers 22 and 26 having an open central volume portion 25 except for the small spaces 23 which may be formed between the filter segments adjacent the spacers 22 and 26. The spaces 23 should not have a height that exceeds about 0.12 inch (0.3048 cm), preferably not greater than about 0.09 inch (0.2286 cm) in order to prevent precipitation of solids from the slurry being filtered.

In operation, fluid feed enters housing 12 through inlet 24, passes through conduit 29, reverses direction as indicated by arrows 31, passes through filter segments 20 and from housing 12 through outlet 15. If desired, housing 12 can be provided with gas vent 17 into which is included a hydrophobic porous filter in a conventional manner which permits passage of gas there through while preventing passage of aqueous liquid there through.

Referring to FIG. 2, the filter cartridge 30 of the prior ad includes a housing 32 having an inlet 34 and an outlet 36. A filter cartridge 38 includes a depth filter 40 wound around a hollow core 42 an end cap 44 sealed to the core 42 and depth filter 40 and an outlet 46. The wound filter 40 is comprised of non-woven fibers as described above. The interior of housing 32 includes a void volume 39. When a slurry is filtered with this filter cartridge, the filter becomes plugged rapidly due to precipitation of particles from the slurry onto the exposed surface of the depth filter adjacent the open void volume 39.

Referring to FIG. 3, the outside surface of the conduit 29 is shown having a groove 33 for O-ring 18 and a groove 35 for retainer 27. The conduit 29 also is provided with flange 37 to provide a support for the filter segments 20. In addition, the conduit 29 also provides the function of supporting the filter material by providing a resting point for the retainer 27 on the outer portion of the conduit 29 thereby keeping the media from collapsing under pressure and maintaining it in place. This is particularly helpful with the use of weak filtration media or systems that are subjected to high pressures or pulsations.

Figure 6A:
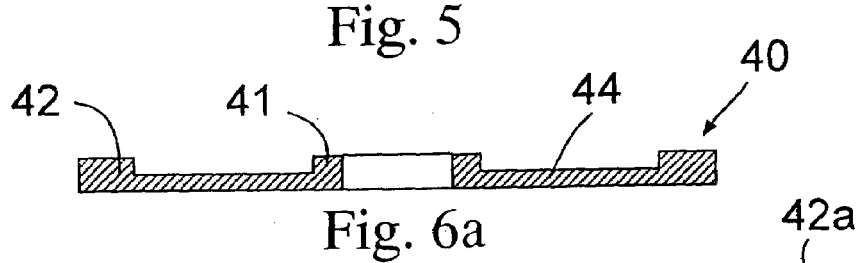
FIG. 6a is a cross-sectional view of a spacer utilised in the present invention.
Figure 6B:
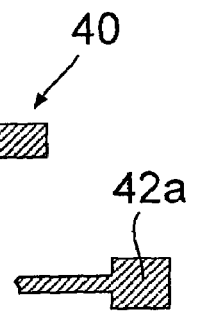
FIG. 6b is a cross-sectional view of a portion of an alternative spacer utilised in the present invention.
Figure 6C:
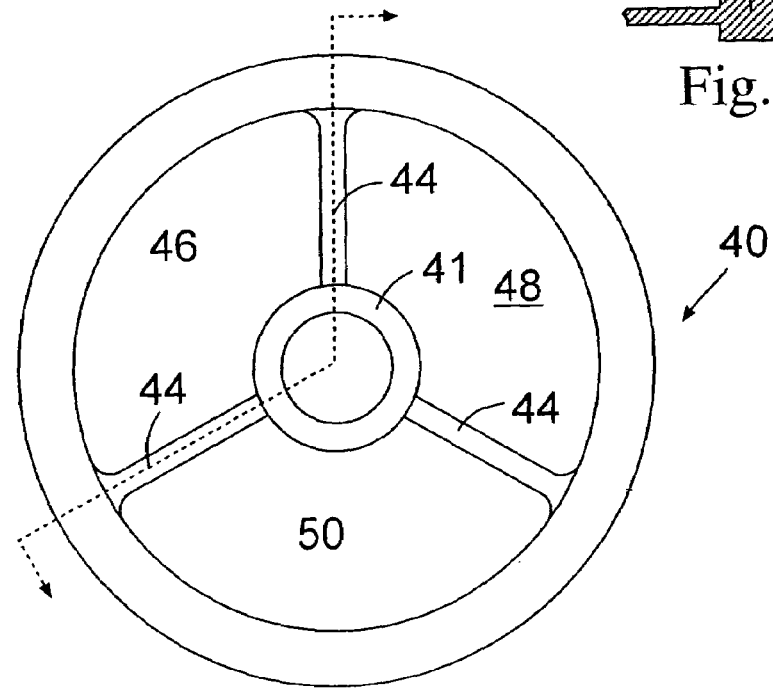
FIG. 6c is a top view of a spacer utilised in the present invention.
Figure 7:
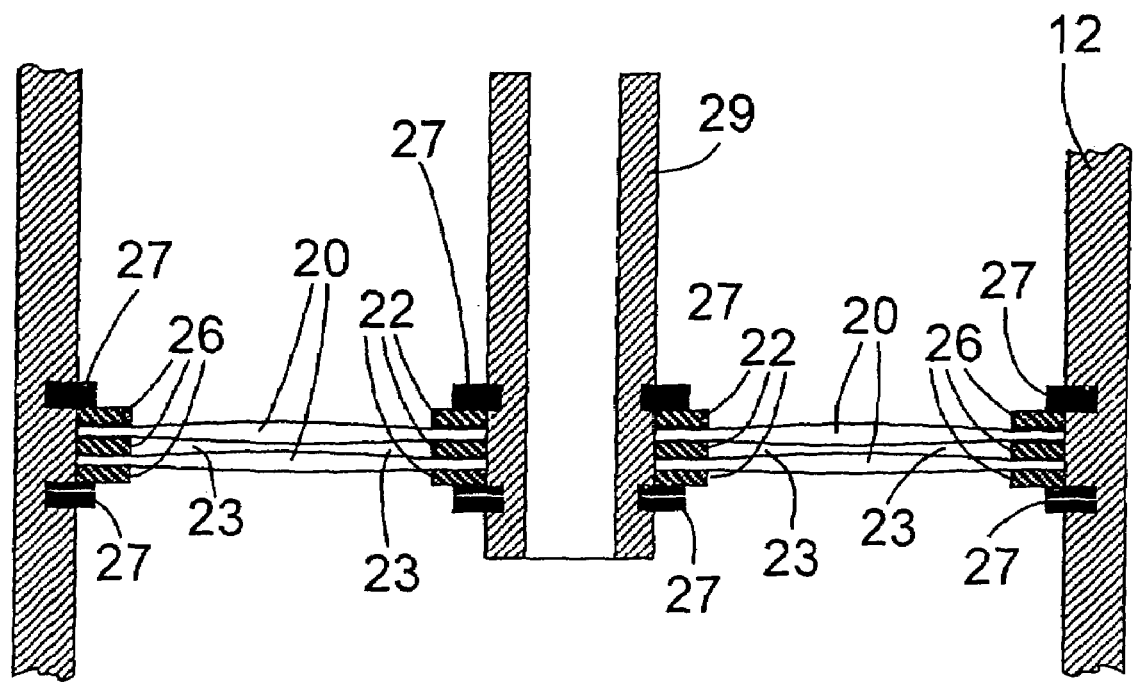
FIG. 7 is a cross-sectional view of an alternative spacer and filter cartridge useful in the present invention

Referring to FIGS. 6a, 6b and 6c, the spacer 40 includes an internal spacer segment 41 and an external spacer segment 42 connected together by two or more ribs 44. As shown, the height of the external and internal spacer segments 41, 42 are the same, but they are different than those of the ribs 44. However, if desired, all three sections 41,42,44 may all be the same thickness or the ribs 44 could be of greater thickness than the spacers 41,42 or they can all be of different heights if one desires so long as they don't adversely affect the flow or filtration characteristics of the device. Spacer segment 41 seals the outer surface of conduit 29 in the manner set forth above. Spacer segment 42 seals the inner surface of the housing 12 in the manner set forth above. The cross-section of spacer segment 42 can be modified as 42a as shown in FIG. 6b. Fluid to be filtered passes through areas 46, 48 and 50.

Figure 9:
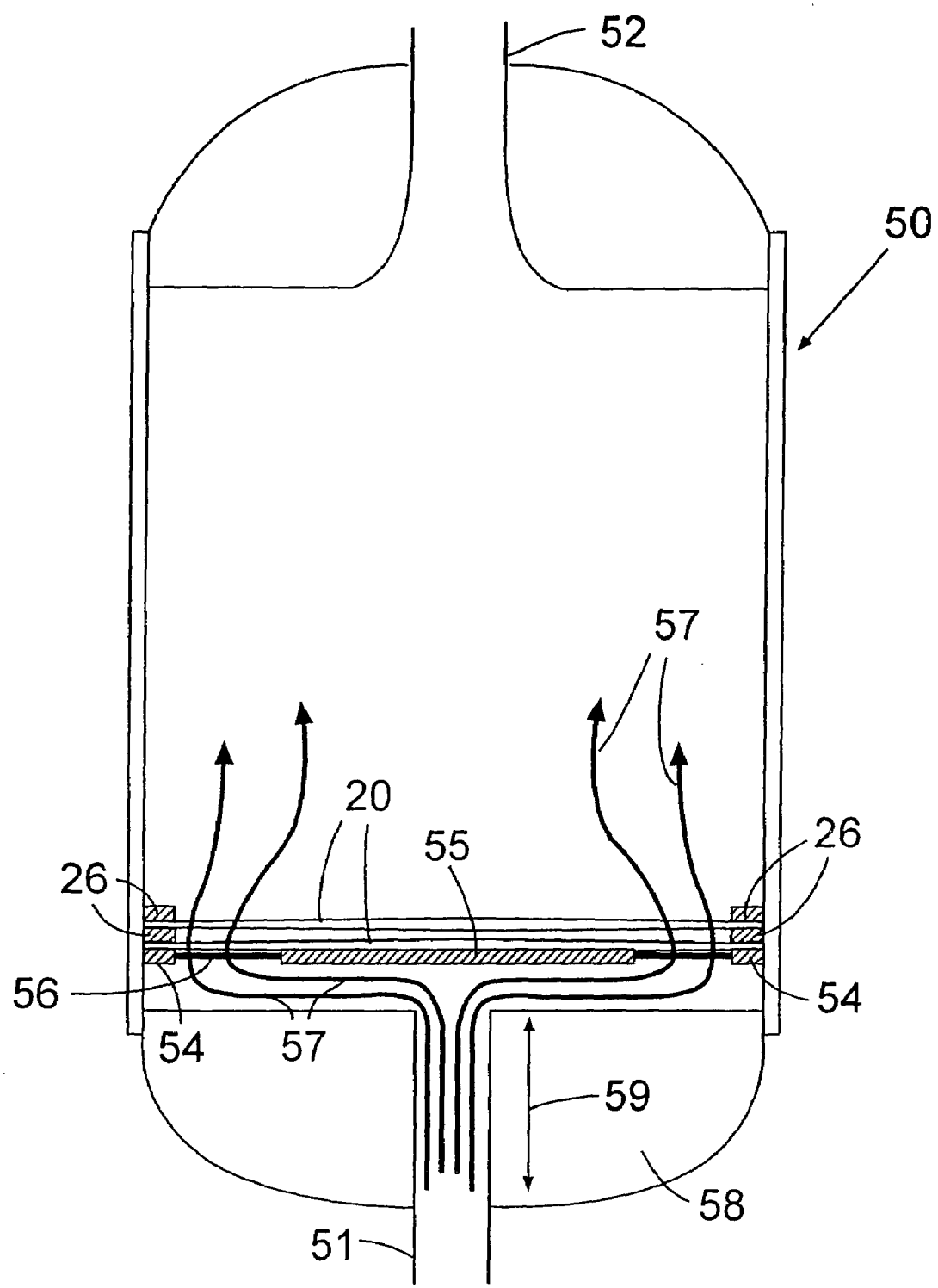
FIG. 9 is a cross-sectional view of an alternative filter cartridge of this invention.
Figure 10:
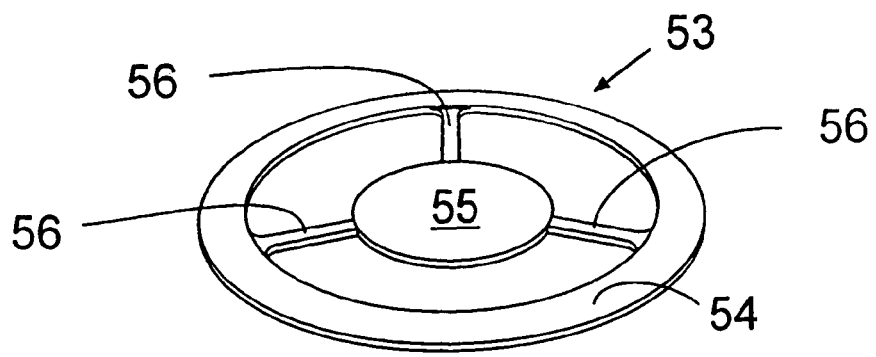
FIG. 10 is a top view of an alternative spacer useful in the present invention.

Referring to FIGS. 9 and 10, the filter cartridge 50 includes an inlet 51 and an outlet 52. The cartridge 50 includes spacers 26 which function for the same purpose as spacers 26 of FIG. 1 and spacer 53 formed of spacer segment 54 and spacer segment 55 joined together by ribs 56. Fluid flow through the filter segments 20 by the paths represented by arrows 57. The maximum height 59 of the space 58 is less than about 1.0 inches (2.54 cm) preferably less than about 0.5 inches (1.27 cm). This height is sufficiently small as to prevent separation of solid particles from a slurry to be filtered while promoting the desired uniform distribution of incoming slurry feed. In addition, the center support spacer segment 55 can also provide the function of supporting the filter material, keeping it from collapsing under pressure and maintaining it in place (in a manner similar to that which occurs with the conduit 29 in FIGS. 1 and 3.

Figure 8A:
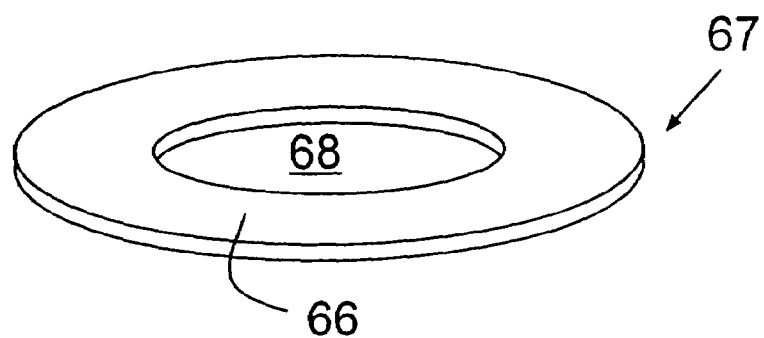
FIG. 8a is a planar view of a spacer utilised in the present invention.
Figure 8:
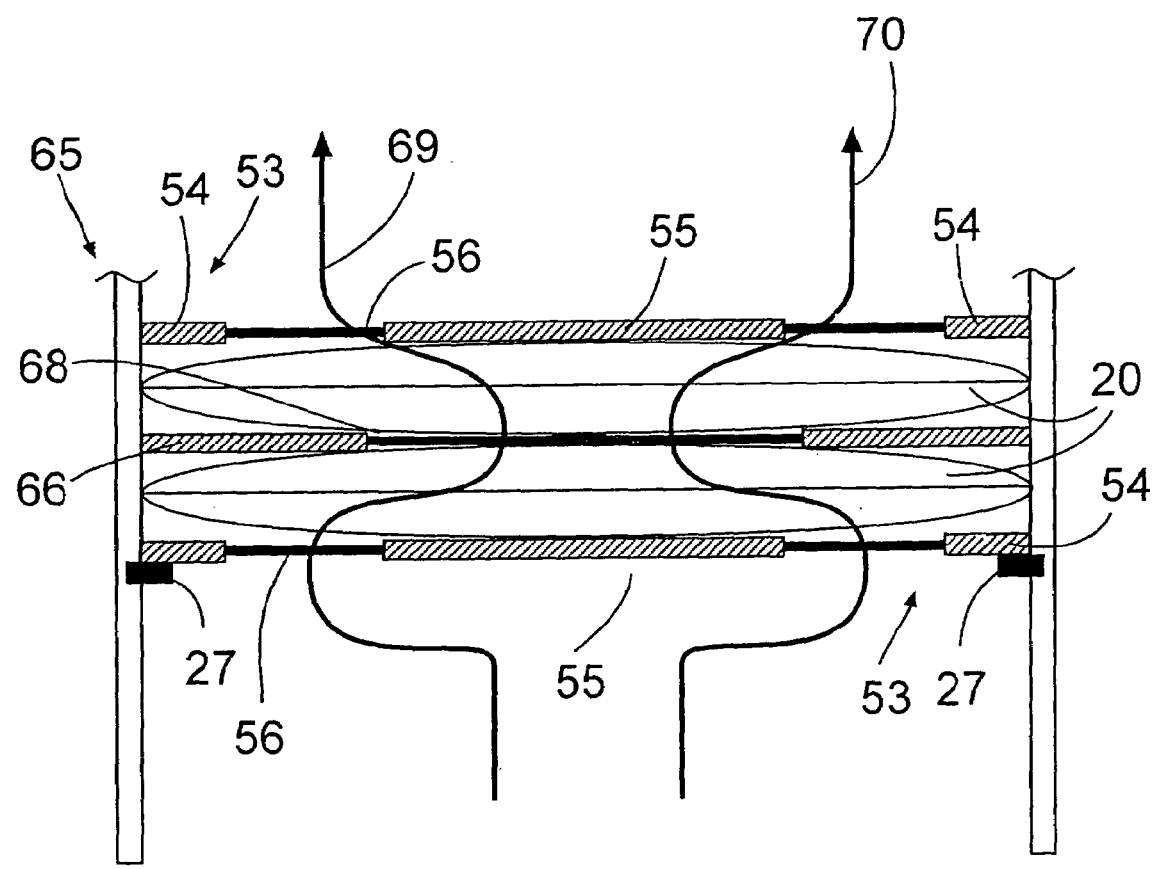
FIG. 8 is a cross-sectional view of an alternative filter cartridge of this invention.

Referring to FIGS. 8 and 8A the filter cartridge 65 includes the spacer 67 (FIG. 8A) formed of a solid portion 66 and a central open portion 68, the spacer 53 (FIG. 10) and retainers 27 to provide a fluid flow path represented by arrows 69 and 70.

Figure 11:
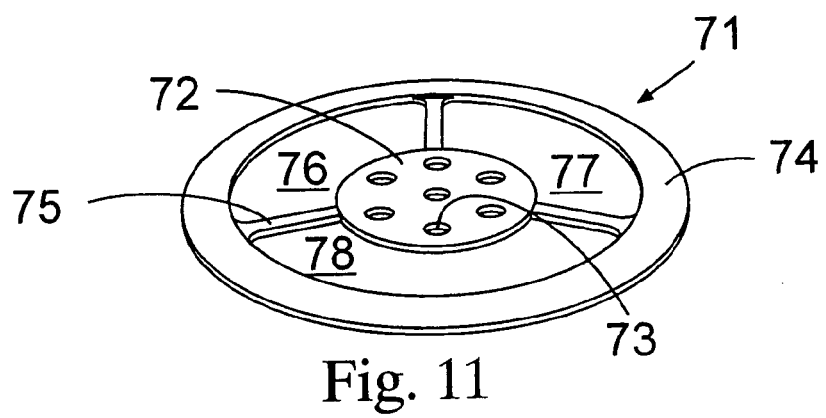
FIG. 11 is a top view of an alternative spacer useful in the present invention.

Referring to FIG. 11, the spacer 71 includes an inner spacer segment 72 having holes 73 and outer spacer segment 74. The spacer segments 72 and 74 are joined by ribs 75, Fluid flow is effected through areas 76, 77 and 78 as well as through holes 73.

Figure 12:
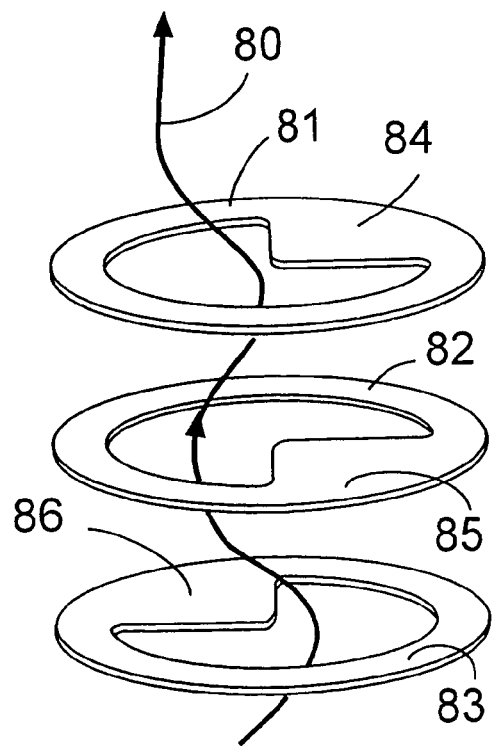
FIG. 12 is an isometric view of a spacer arrangement useful in the present invention.

Referring to FIG. 12, the fluid path represented by arrow 80 is effected within a filter cartridge of this invention by spacers 81, 82 and 83 having closed areas 84, 85 and 86. The outer surfaces of spacers 81, 82 and 83 are positioned within a filter cartridge along the interior wall of the cartridge for the same purpose as set forth above with reference to spacer 26.

We claim:

1. A filtration cartridge for filtering a slurry composition to remove undesirably large particles therefrom comprising:
    a hollow housing having a housing inlet and a housing outlet;
    a conduit within said housing in fluid communication with said housing inlet, said conduit having a conduit inlet and a conduit outlet;
    a depth filter comprising depth filter segments separated by annular spacers, said annular spacers having an open portion and a solid portion, said annular spacers surrounding and being sealed along the conduit, said depth filter formed of non-woven polymeric fibers and having a thickness to retain undesirably large particles of said slurry while permitting passage therethrough of particles of said slurry within a desired size range, said depth filter material having progressively smaller micron particle retention in the direction of fluid flow, said retention being greatest adjacent the outlet;
    a slurry flow pat defined by sequential passage through said housing inlet, said conduit inlet, said conduit outlet, said depth filter and said housing outlet; and
    an open void volume of not greater than one inch in height as to prevent separation of solid particles from the slurry, said open void volume upstream of a first surface of said depth filter in contact with said slurry;
    wherein said annular spacers have a height of between about 0.01 and about 0.12 inch, and the ratio of the height of said depth filter segments to the height of said annular spacers being between about 1:1 and about 5:1.

2. The filter cartridge of claim 1 wherein the hollow housing has a first end containing the inlet and the outlet.

3. The filter cartridge of claim 1 wherein said filtration medium is a depth filter selected from the group consisting of a wound depth filter formed of nonwoven fibers, a stack of sheets wherein each sheet comprises nonwoven fibers and a fibrous mass of nonwoven fibers and a fibrous mass of nonwoven polymeric fibers secured together by mechanical entanglement of the fibers.

4. The filter cartridge of claim 1 wherein the spacers are configured to seal the inner surfaces of the filter cartridge housing to prevent channeling of the fluid being filtered along the inner surfaces of the housing.

5. The filter cartridge of claim 1 wherein the spacers are formed of annular inner spacers and annular outer spacers throughout the height of the housing.

6. The filter cartridge of claim 1 wherein the spacers are retained in position by retainers and the retainers are snap rings which fit into grooves of the interior wall of the housing.

7. The filter cartridge of claim 1 further comprising small spaces formed between the filter segments adjacent the spacers.

* * * * *